(12) United States Patent
Mizutani

(10) Patent No.: US 8,253,995 B2
(45) Date of Patent: Aug. 28, 2012

(54) IMAGE READING DEVICE

(75) Inventor: Satoshi Mizutani, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 653 days.

(21) Appl. No.: 12/355,340

(22) Filed: Jan. 16, 2009

(65) Prior Publication Data

US 2009/0185243 A1    Jul. 23, 2009

(30) Foreign Application Priority Data

Jan. 17, 2008    (JP) ................. 2008-007943

(51) Int. Cl.
*H04N 1/04*    (2006.01)
*B65H 7/02*    (2006.01)
(52) U.S. Cl. .... 358/498; 358/474; 358/475; 271/258.01
(58) Field of Classification Search .......... 358/498, 358/1.14, 448, 474; 271/265.01, 258.01; 399/367; 379/201.01
See application file for complete search history.

(56) References Cited

U.S. PATENT DOCUMENTS

| | | | | |
|---|---|---|---|---|
| 5,327,259 | A * | 7/1994 | Furusawa | 358/474 |
| 7,110,148 | B2 * | 9/2006 | Hasegawa et al. | 358/474 |
| 7,694,963 | B2 * | 4/2010 | Iwago et al. | 271/258.01 |
| 2009/0067012 | A1 * | 3/2009 | Iwayama | 358/475 |

FOREIGN PATENT DOCUMENTS

| | | |
|---|---|---|
| JP | 08-290858 | 11/1996 |
| JP | 2001-312106 | 11/2001 |
| JP | 2002-044374 | 2/2002 |
| JP | 2005-331820 | 12/2005 |
| JP | 2006-174107 | 6/2006 |
| JP | 2007-320709 | 12/2007 |

OTHER PUBLICATIONS

Translation of Japanese Reference: JP02007320709A.*
Notification of Reasons of Refusal for Japanese Application No. 2008-007943 mailed Oct. 27, 2009.

* cited by examiner

*Primary Examiner* — Charlotte M Baker
*Assistant Examiner* — Rury Grisham
(74) *Attorney, Agent, or Firm* — Banner & Witcoff, Ltd.

(57) ABSTRACT

An image reading device is provided. The image reading device includes: a conveying section which includes a first tray for placing a document before reading and a second tray for placing a document after reading, and which conveys a document from the first tray to the second tray via a reading region; a reading section which reads the document passing through the reading region; a stopping section which stops a trailing end of the document conveyed by the conveying section within the reading region; and a determining section which determines whether the document remains within the reading region based on a signal from the reading section.

11 Claims, 11 Drawing Sheets

IMAGE READING DEVICE

CROSS-REFERENCE TO RELATED APPLICATION

This application claims priority from Japanese Patent Application No. 2008-007943, filed on Jan. 17, 2008, the entire subject matter of which is incorporated herein by reference.

TECHNICAL FIELD

Aspects of the present invention relate to an image reading device including an automatic document feeder for automatically feeding a document in a document reading position, more particularly, to an image reading device for preventing leaving of a document after the document is read using the automatic document feeder.

BACKGROUND

A document reading device mounts thereon an Automatic Document Feeder (ADF) used for automatically reading plural documents. The ADF includes a sheet feeding table for placing thereon a document before reading and a sheet discharging tray for placing a document after reading. When at least one document is placed on the sheet feeding table, the documents are sequentially fed toward a document reading position one by one from the uppermost document. Each of the documents is read at the document reading position by a scanner and is conveyed to the sheet discharging tray.

In such ADF, the sheet discharging tray is generally arranged under the sheet feeding table. As a result of that, a document after reading is discharged to a position hidden by the sheet feeding table. Therefore, a user may leave the document after the reading is completed. When the document is left, trouble such as loss of the document occurs. Also, leaving of the document has a problem in secrecy of a copying machine and the like used by plural users.

Hence, in order to prevent such a document from being left, JP-A-2001-312106 describes an image forming device for arranging a discharged document detecting sensor under a sheet discharging tray of the ADF. If it is detected that a document remains on the sheet discharging tray by the discharged document detecting sensor, this image forming device displays that the document remains, on a display panel at the front of the image forming device. By this display, attention to leaving of the document is drawn and the document is prevented from being left.

However, in the related-art image reading device as described above, it is necessary to add a dedicated sensor for detecting a document on the sheet discharging tray of the ADF. As a result, cost increases and a device configuration becomes more complex due to an increase in the number of components.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image reading device capable of reducing or preventing a document from being left by a smaller number of components.

According to an exemplary embodiment of the present invention, there is provided an image reading device including: a conveying section which includes a first tray for placing a document before reading and a second tray for placing a document after reading, and which conveys a document from the first tray to the second tray via a reading region; a reading section which reads the document passing through the reading region, a stopping section which stops a trailing end of the document conveyed by the conveying section within the reading region, and a determining section which determines whether the document remains within the reading region based on a signal from the reading section.

According to an exemplary embodiment of the present invention, there is provided a document remaining determining device including: a conveying section which conveys a document in a first direction to pass a reading region; a reading section which includes a plurality of sensors extending in a second direction orthogonal to the first direction; a holder including a surface opposes the plurality of sensors, the surface having a pattern in the second direction; and a determining section which determines whether the document remains within the reading region based on a signal from the reading section.

According to an exemplary embodiment of the present invention, there is provided a document reading device including: a first roller which conveys a document from a first tray via a reading region; a pair of second rollers which convey the document conveyed via the reading region to discharge the document to a second tray; and a roller controller which controls the pair of second rollers to stop while nipping a trailing end of the document.

According to an exemplary embodiment of the present invention, there is provided a document reading device including: a conveying section which includes a first tray for placing a document before reading and a second tray for placing a document after reading, and which conveys a document from the first tray to the second tray via a reading region; a reading section which reads the document passing through the reading region; and a controller which moves a position of the reading section during the reading of the document.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

An exemplary embodiment of the present invention will be described in detail with reference to the accompanying drawings. In the present exemplary embodiment, the inventive concept of the present invention is applied to a multi function device including a scanner function, a printer function, a copy function, a facsimile function and the like.

[Configuration of Multi Function Device]

Figure 1:
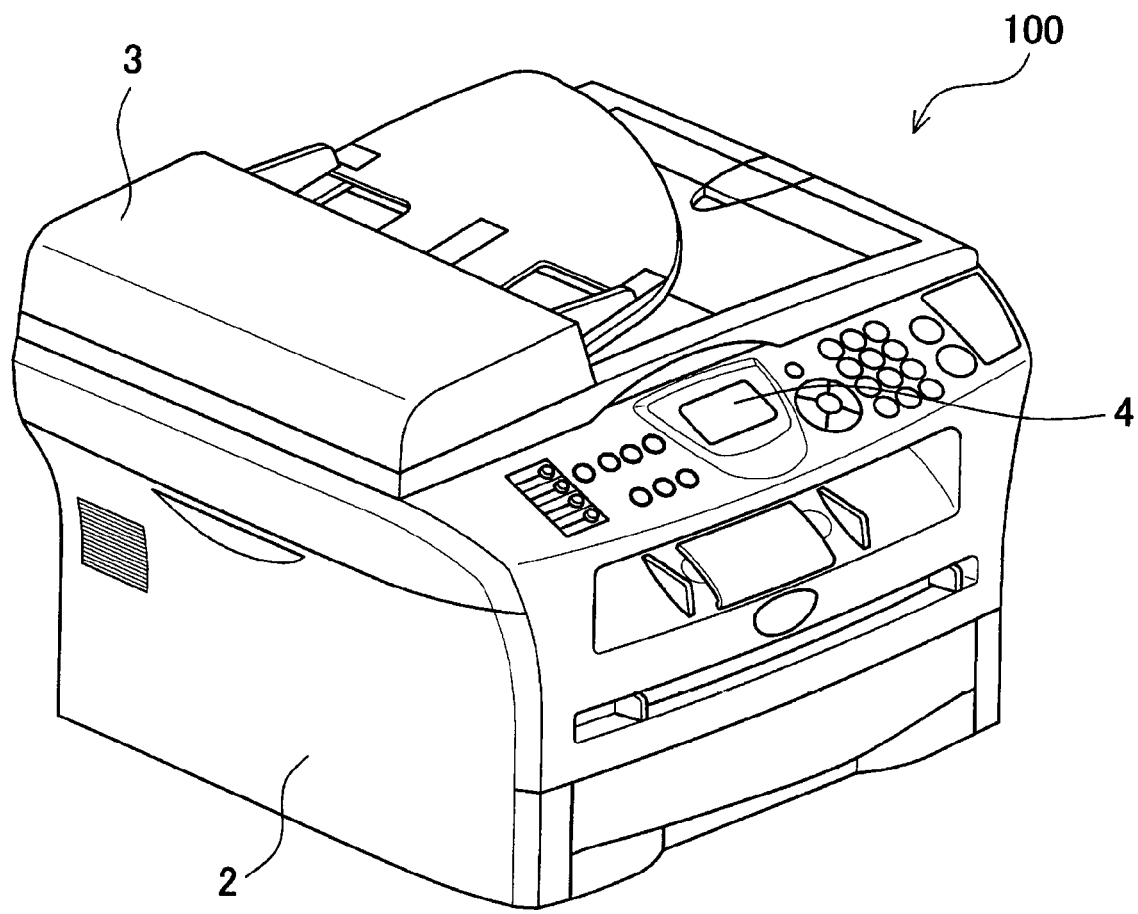
FIG. 1 is a diagram showing appearance of a multi function device according to an exemplary embodiment.

A multi function device 100 of the exemplary embodiment includes a body 2 including an image forming section 38 which forms an image on a sheet, and a scanner section 3 which reads an image of a document as shown in FIG. 1. An image forming system employed by the image forming section 38 may be an electrophotographic type or an ink-jet type. The image forming section 38 may form a color image or may be dedicated to a monochrome image.

The scanner section 3 includes an operation panel 4 having various buttons or a liquid crystal display and the like at the front side and an input of operation by a user and display of an operation state are performed by this operation panel 4.

Figure 2:
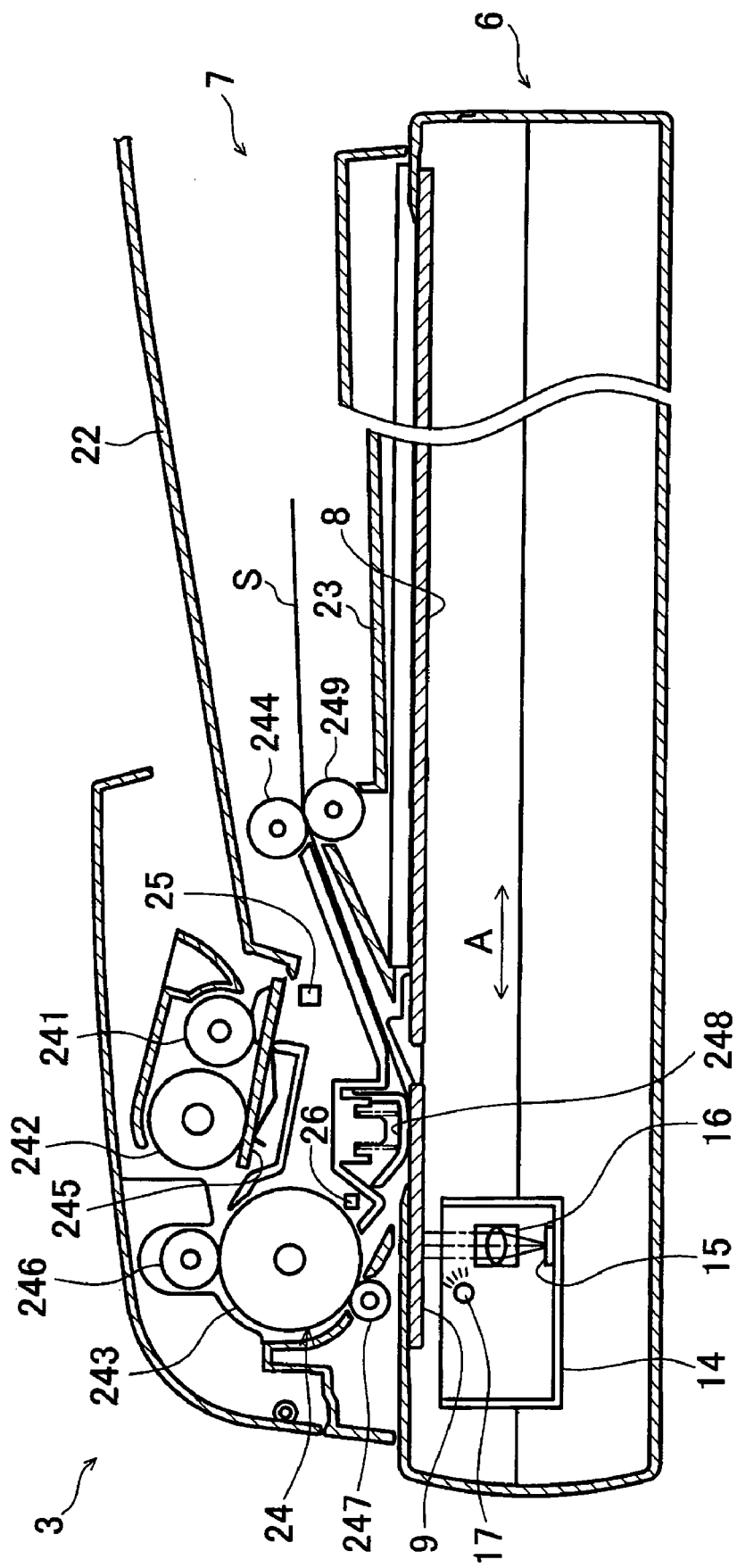
FIG. 2 is a sectional view showing a configuration of a scanner section of the multi function device.

The scanner section 3 includes an image reading section 6 which reads an image of a document and an Automatic Document feeder (ADF) 7 configured to open and cover the upper portion of the image reading section 6 as shown in FIG. 2. The ADF 7 automatically feeds and conveys a document. The image reading section 6 includes two transparent platen glasses 8, 9 positioned on an upper surface of the image reading section 6 and an image sensor 14 positioned inside the image reading section 6.

The image sensor 14 is configured as a Contact Image Sensor (CIS) type, and includes a CMOS imaging element 15, an optical element 16 made of a lens, and a light source 17 made of light emitting diodes of RGB. The CMOS imaging element 15 includes plural photodiodes arranged in a line in a main scanning direction (a direction orthogonal to a conveying direction), and reflected light at the time of irradiating a document with light by the light source 17 is received by the individual CMOS imaging elements 15 through the optical element 16 and light intensity (brightness) of the reflected light is converted into an electrical signal and is outputted for every pixels.

The ADF 7 includes a document tray 22 for placing a document before reading and a discharging tray 23 for placing the document after reading. Specifically, the document tray 22 is disposed above the discharging tray 23. A conveyance path 24 for coupling the document tray 22 to the discharging tray 23 is disposed inside the ADF 7. The ADF 7 takes documents placed on the document tray 22 one by one and conveys the documents to a position opposed to the platen glass 9 (hereinafter referred to as an "ADF glass 9"). Thereafter, the document is discharged to the discharging tray 23. The details of the ADF 7 will be described below.

An image reading system employed by the multi function device 100 includes a flatbed (document fixing scan) type and an ADF (document moving scan) type. In the case of the flatbed type, a document is placed on the platen glass 8 (hereinafter referred to as an "FB glass 8") one by one. In this state, the image sensor 14 moves in a sub-scanning direction (a direction orthogonal to the main scanning direction or a direction of an arrow A of FIG. 2) and an image of the document is read on a line-by-line basis in the main scanning direction at that time. On the other hand, in the case of the ADF type, documents are collectively placed on the document tray 22. The image sensor 14 moves in a position opposed to the ADF glass 9 and is fixed. In this state, the documents are conveyed to the position opposed to the ADF glass 9 one by one and an image of the conveyed document is read on a line-by-line basis in the main scanning direction at that time.

Subsequently, the ADF 7 will be described in detail. The ADF 7 has a suction roller 241, a separation roller 242, a conveyance roller 243, a discharge roller 244, a suction guide 245 in pressure contact with the suction roller 241 and the separation roller 242, pressure rollers 246, 247 in pressure contact with the conveyance roller 243, a document holder 248 opposed to the ADF glass 9, and a pressure roller 249 in press contact with the discharge roller 244. Then, the conveyance path 24 of a document is formed by these rollers and the like. Specifically, the conveyance path 24 of the ADF 7 configures a path which starts from the document tray 22 and is routed through the suction roller 241 and the separation roller 242 and turns around by the conveyance roller 243 and passes through a gap between the document holder 248 and the ADF glass 9 and goes through the discharge roller 244 and turns toward the discharging tray 23.

The suction roller 241, the separation roller 242, the conveyance roller 243 and the discharge roller 244 are rotated and driven by a motor (not shown). The pressure rollers 246, 247 rotate according to the conveyance roller 243, and the pressure roller 249 rotates according to the discharge roller 244. The discharge roller 244 is configured to switch between forward rotation and backward rotation. That is, a backward conveyance of a document can be performed.

The ADF 7 includes a front sensor 25 positioned at the periphery of the suction roller 241 and a rear sensor 26 positioned at the periphery of the conveyance roller 243. The front sensor 25 detects a document existing at an inlet of the suction roller 241 and is used in determination as to whether a document is placed on the document tray 22. On the other hand, the rear sensor 26 detects a document existing at an outlet of the conveyance roller 243 and is used in position adjustment of the trailing end of the document or detection of reading start timing of the document.

Figure 3:
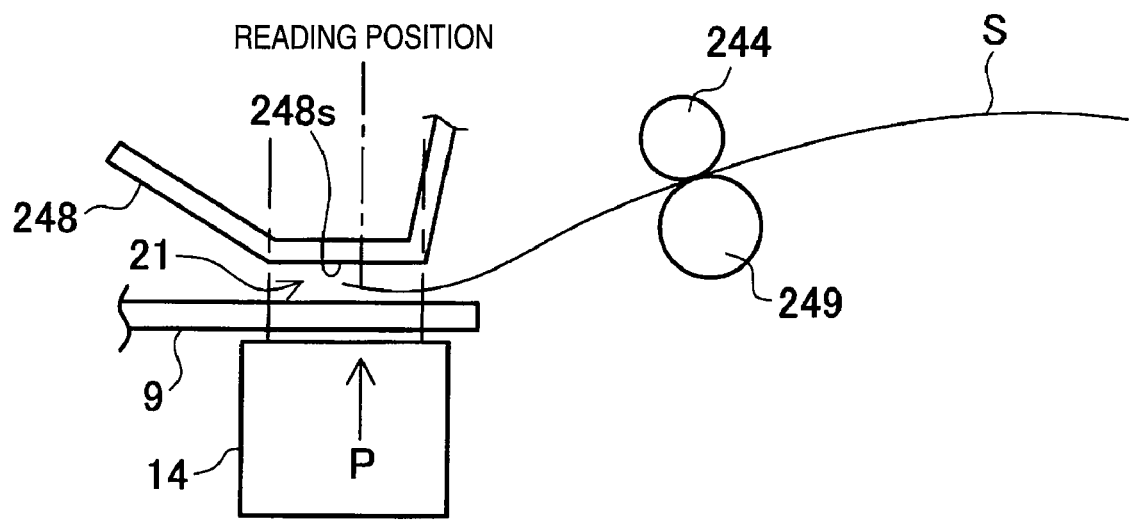
FIG. 3 is a diagram showing a schematic configuration of the periphery of a reading region according to a first mode of the exemplary embodiment.

In the ADF 7, a document S passes through a gap between the document holder 248 and the ADF glass 9 as shown in FIG. 3. A region in which the ADF glass 9 is opposed to the document holder 248 is defined as a reading region 21 of the document S. In other words, the reading region refers to a region in which the image sensor 14 can read the document S being conveyed in the conveyance path 24. The image sensor 14 is fixed so that a reading point P of the image sensor 14 matches a predetermined position (a reading position) of the inside of the reading region 21 at the time of reading the document S.

Also, in the document holder 248, a surface 248s opposed to the ADF glass 9 is a white color. Therefore, a white output is detected in the whole of the sub-scanning direction by the image sensor 14 in when the document S does not pass through the reading region 21. On the other hand, in the case of reading the document S, an output closer to black is detected as compared with the case of reading the document holder 248 even if the document S is white. Accordingly, a size of the document S in the sub-scanning direction is detected by a contrast between an output signal level in the case of reading the document holder 248 and an output signal level in the case of reading the document S.

[Electrical Configuration of Multi Function Device]

Figure 4:
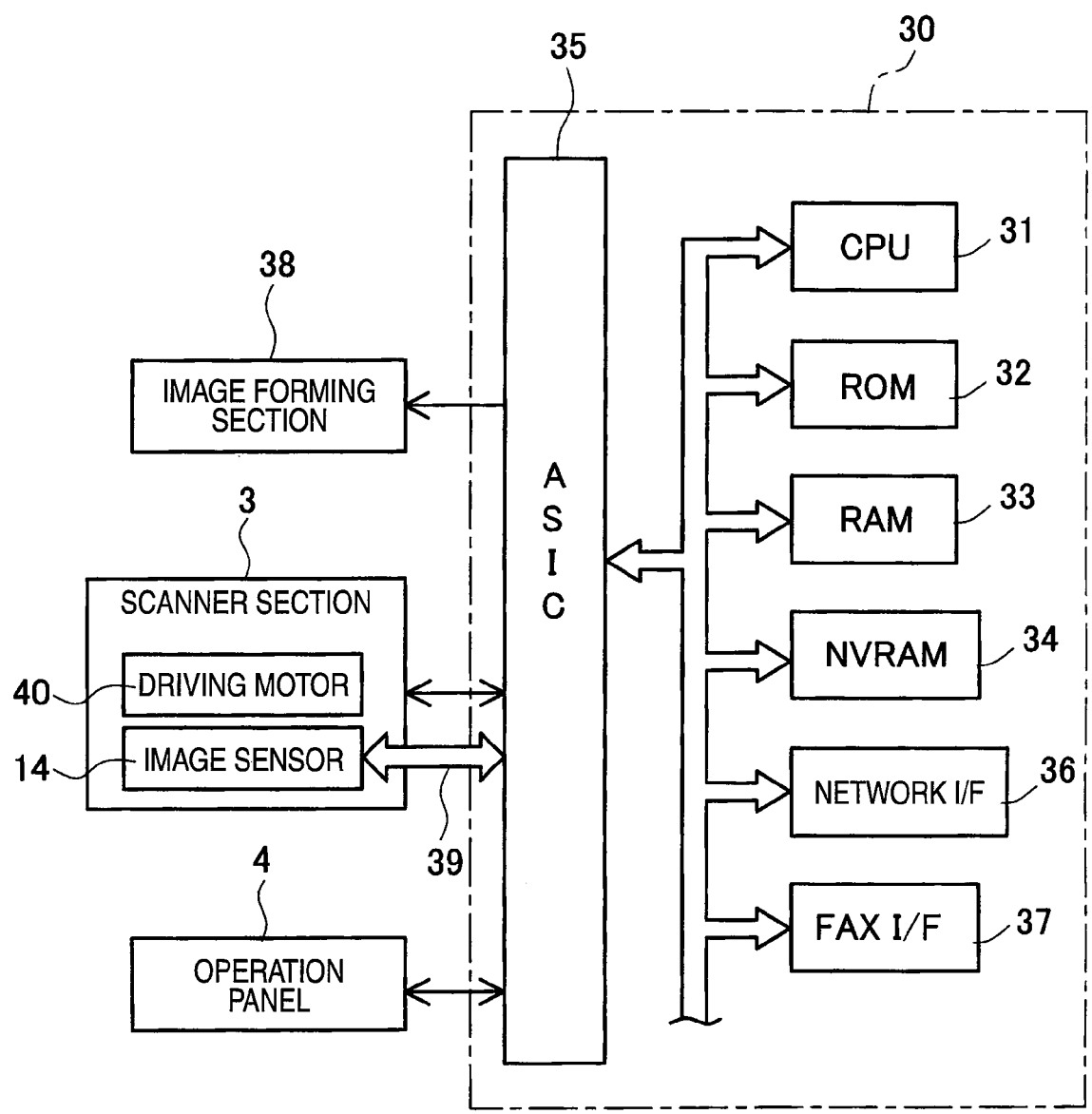
FIG. 4 is a block diagram showing an electrical configuration of the multi function device according to the exemplary embodiment.

Subsequently, an electrical configuration of the multi function device 100 will be described. The multi function device 100 includes a control device 30 including a central processing unit (CPU) 31, a read only memory (ROM) 32, a random access memory (RAM) 33, a nonvolatile random access memory (NVRAM) 34, an application specific integrated circuit (ASIC) 35, a network interface 36 and a facsimile interface 37 as shown in FIG. 4.

Various control programs for controlling the multi function device 100, various settings, an initial value and the like are stored in the ROM 32. The RAM 33 is used as a work region in which various control programs are read out or a storage region in which image data is temporarily stored.

The ASIC 35 is electrically connected to an image forming section 38, the scanner section 3, the operation panel 4 and the like. The CPU 31 controls each of the components such as a motor (not shown) for movement of the image sensor 14 or a driving motor 40 for various rollers configuring the conveyance path 24 of the ADF 7 in the multi function device 100 through the ASIC 35 while storing a processing result in the RAM 33 or the NVRAM 34 according to the control program read out of the ROM 32.

An information processing device is connectable to the network interface 36 and mutual data communication can be conducted through the network interface 36. The facsimile interface 37 is connectable to a telephone line and data communication with an external facsimile device and the like can be conducted through this facsimile interface 37.

[Document Conveyance Control (First Mode)]

Figure 5:
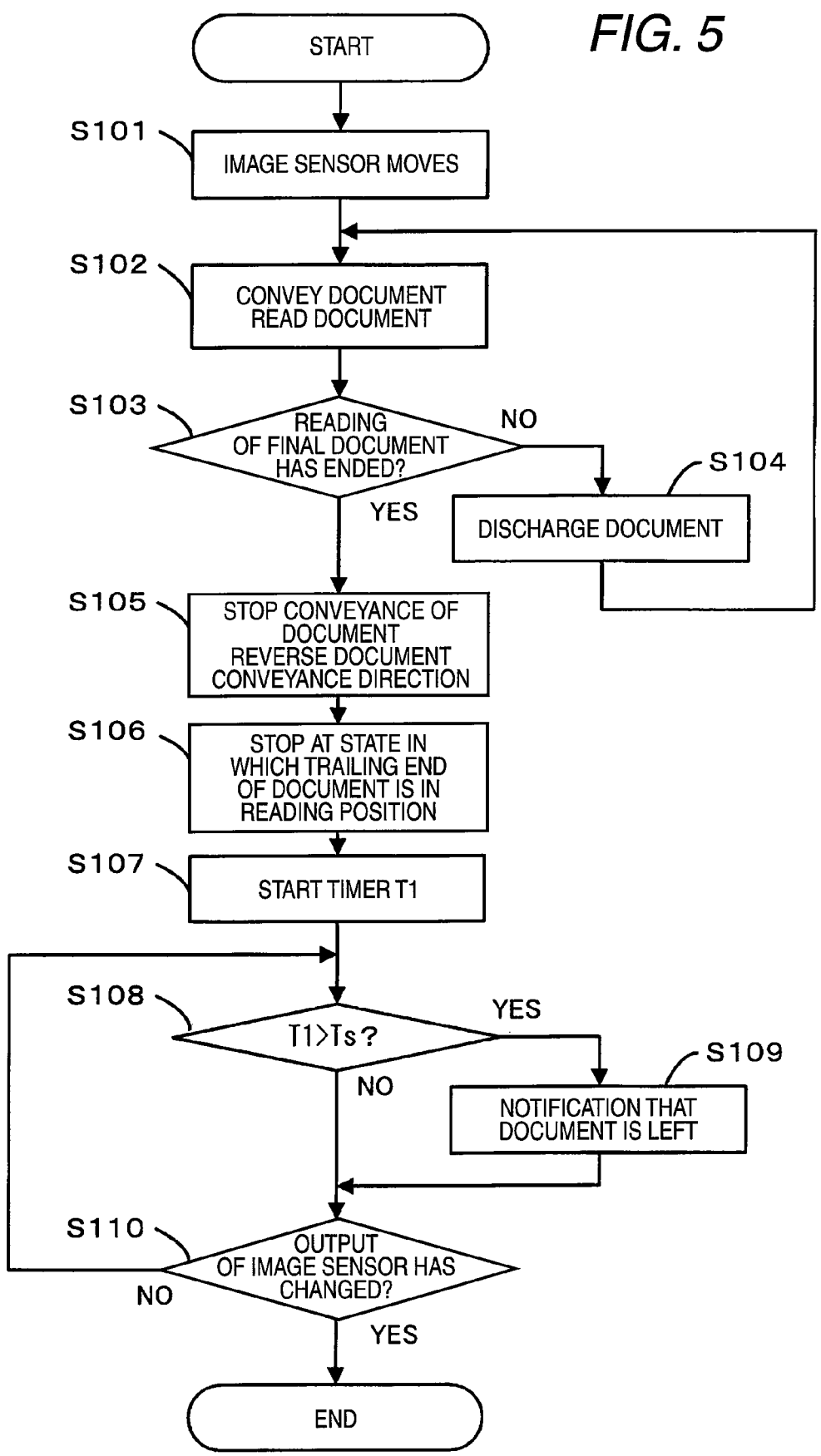
FIG. 5 is a flowchart showing a procedure (first mode) of a document conveyance operation at the time of reading a document by an ADF.

Subsequently, document conveyance control at the time of reading a document by the ADF 7 will be described with reference to a flowchart of FIG. 5. In the following explanation, it is assumed that plural documents would be previously placed on the document tray 22. When a scan start button of the operation panel 4 is pressed, automatic document conveyance of the ADF 7 is started.

First, the image sensor 14 moves to a position opposed to the document holder 248 just under the ADF glass 9 while the ADF glass 9 being sandwiched therebetween (S101). That is, the image sensor 14 moves to the position at which the reading point P matches the predetermined reading position of the inside of the reading region 21 as shown in FIG. 3. Thereafter, a document is conveyed inside the conveyance path 24 one by one and an image of the document is read by the image sensor 14 while the document passing through the reading position (S102).

Next, it is determined whether reading of the final document has ended (S103). The determination as to whether a conveyed document is the final document can be made based on a signal from the front sensor 25. That is, if the document is not detected by the front sensor 25, the document conveyed into the suction roller 241 at the last time is supposed to be the final document. If the document is not the final document (S103: NO), the read document is discharged to the discharging tray 23 (S104) and the next document is conveyed toward the reading region 21.

If reading of the final document has ended (S103: YES), conveyance in a forward direction is stopped while the discharge roller 244 pinching the final document and conveyance of the document in a backward direction is started (S105). Specifically, the conveyance in the forward direction is stopped at the position before the trailing end of the final document is discharged from the discharge roller 244 after the trailing end passes through the reading position. The trailing end of the final document is detected by the rear sensor 26 and a position of the trailing end of the final document is presumed based on the subsequent elapsed time. In other words, in the control of the first mode, the conveyance is stopped after the trailing end of the final document passes through the reading position. That is, the final document is read from the leading end to the trailing end of the final document, and therefore, the reading of the document is surely performed.

Thereafter, the conveyance of the final document in the backward direction is performed while pinched by the discharge roller 244 and the conveyance is stopped at a state in which the trailing end of the final document reaches a reading position (S106). The "trailing end" herein refers to the portion positioned in the trailing end side of a document conveyance direction in the case of conveying the document in a forward direction. Consequently, the final document remains in the conveyance path 24 and documents other than the final document are placed on the discharging tray 23 (see FIG. 3). Since the trailing end of the document is in the reading position, the trailing end of the document can be read by the image sensor 14. That is, it can be determined whether the final document remains based on a reading signal from the image sensor 14.

Then, a timer T1 is initialized and is started (S107). Thereafter, it is determined whether the timer T1 has measured a specific time Ts (S108). If the timer T1 has measured the specific time Ts (S108: YES), a user is notified that a document is left (S109). As notifying means, for example, a message indicating that the document is left is displayed on the operation panel 4. Additionally, warning sound may be emitted for notifying the user. After notification that the document is left, the control proceeds to operation S110.

Figure 6:
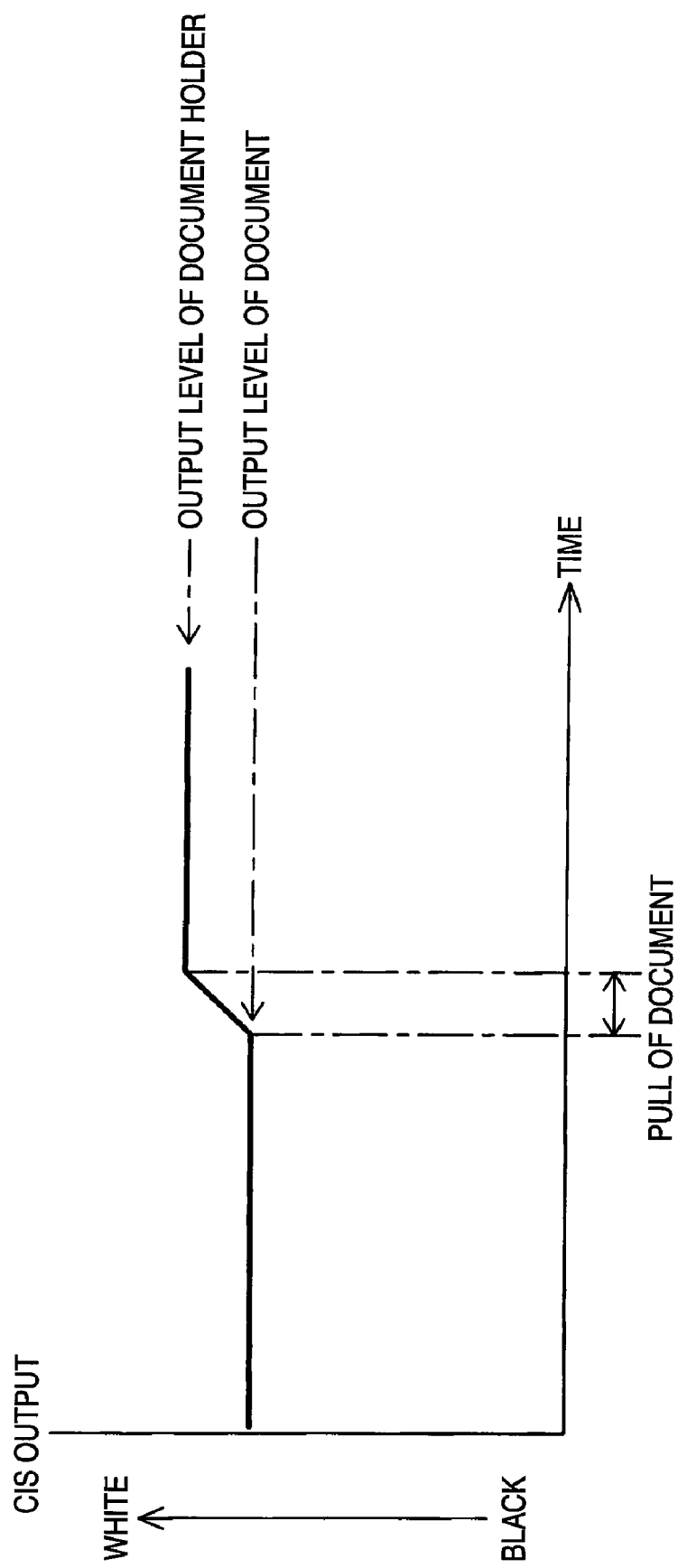
FIG. 6 is a graph showing an image of a change in an output of an image sensor in the case of removing a document.

If the timer has not measured the specific time Ts (S108: NO), it is determined whether the output of the image sensor 14 has changed by a threshold value or more (S110). That is, a difference exists in the output of the image sensor 14 between a state in which the trailing end of the document remains and the document is read and a state in which the document is removed and the white document holder 248 is read. As a result, when the document is removed, the output of the image sensor 14 changes as shown in FIG. 6. In other words, it can be determined whether the document is removed by monitoring the output of the image sensor 14.

If the output of the image sensor 14 is not changed (S110: NO), it is determined that the final document still remains, and the control returns to operation S108. On the other hand, if the output of the image sensor 14 has changed (S110: YES), it is determined that the final document is removed, and the control ends. In the above operations, the timer T1 measures a time period during which the document remains within the reading region 21. If it is determined that the document remains within the reading region 21 longer than the specific time Ts, the user is notified.

When a user removes the final document, the document is pulled while rotating the discharge roller 244 which pinches the final document. When the discharge roller 244 is coupled to a driving motor at this time, the driving motor works as a load when pulling the final document and it becomes difficult to pull the document. Hence, the discharge roller 244 is configured so that resistance in a document pull direction (the forward direction of the document) becomes smaller than resistance in the opposite direction after reading of the final document ends. For example, this can be implemented by coupling the discharge roller 244 to the driving motor through a one-way clutch. Consequently, it becomes easy to pull the final document.

[Document Conveyance Control (Second Mode)]

Figure 7:
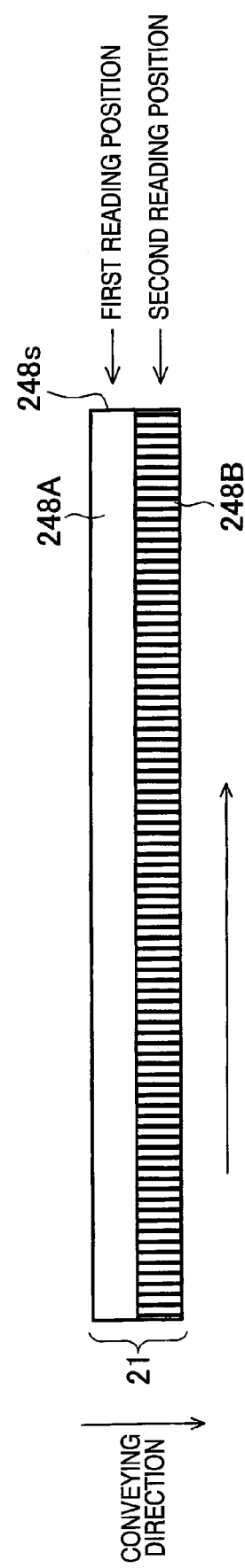
FIG. 7 is a diagram showing a pattern of a surface opposed to an ADF glass of a document holder according to a second mode of the exemplary embodiment.

Subsequently, a second mode of document conveyance control will be described. In the ADF 7 of the second mode, the surface 248s opposed to the ADF glass 9 of the document holder 248 is divided into a white region 248A positioned in the upstream side (side of the document tray 22) in the conveying direction (the sub-scanning direction) of the document and a pattern region 248B positioned in the downstream side (side of the discharging tray 23) as shown in FIG. 7. This aspect is different from the first mode in which the surface opposed to the ADF glass 9 of the document holder 248 has only the white region.

Figure 8:
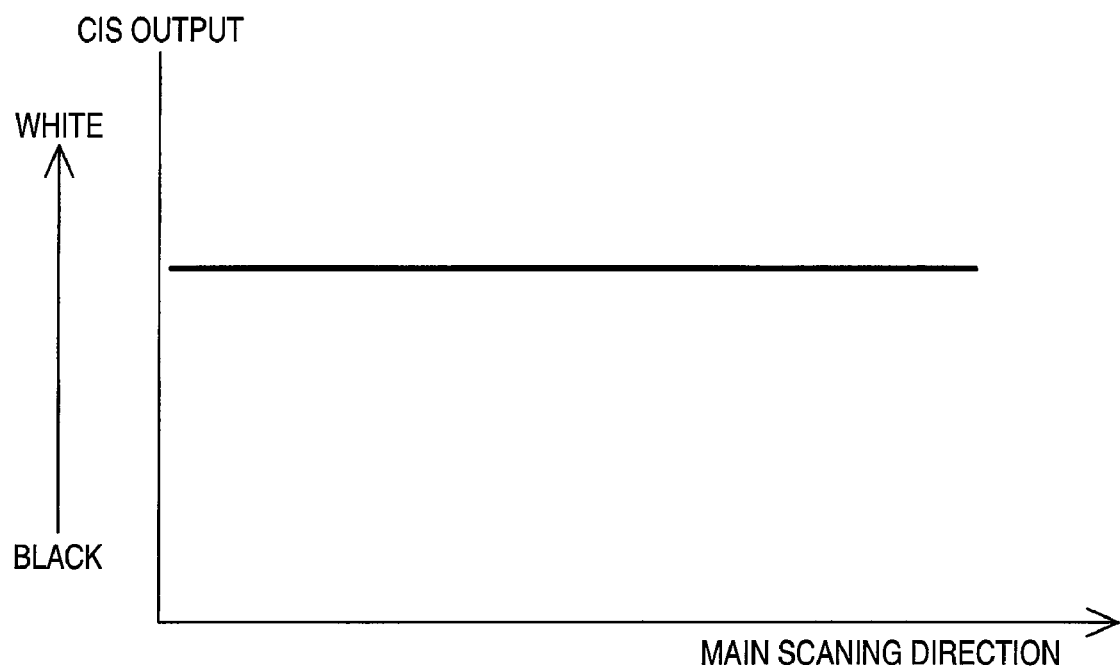
FIG. 8 is a graph showing an image of the image sensor in the case of reading a white region.
Figure 9:
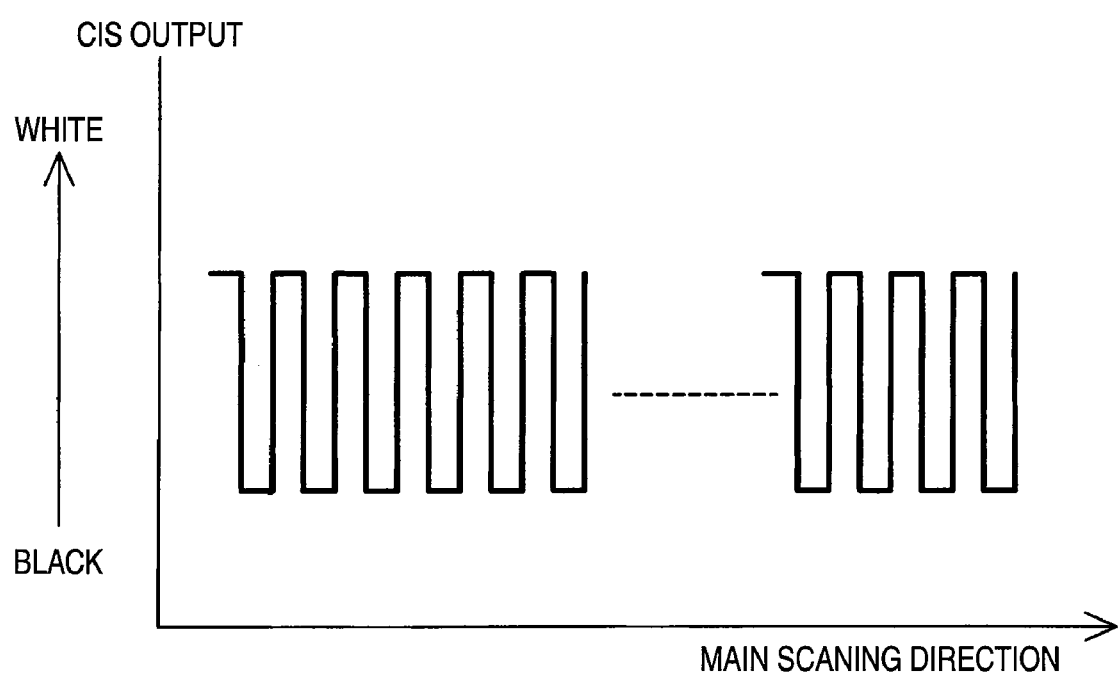
FIG. 9 is a graph showing an image of the image sensor in the case of reading a pattern region.

The white region 248A is a region which is white entirely in the main scanning direction. When the image sensor 14 reads the white region 248A, a white level is detected over entirely in the main scanning direction as shown in FIG. 8. On the other hand, the pattern region 248B is a region having a pattern of stripes in which black colors and white colors are repeated in the main scanning direction. When the image sensor 14 reads the pattern region 248B, white levels and black levels are alternately detected at predetermined distances in the main scanning direction as shown in FIG. 9.

Figure 10:
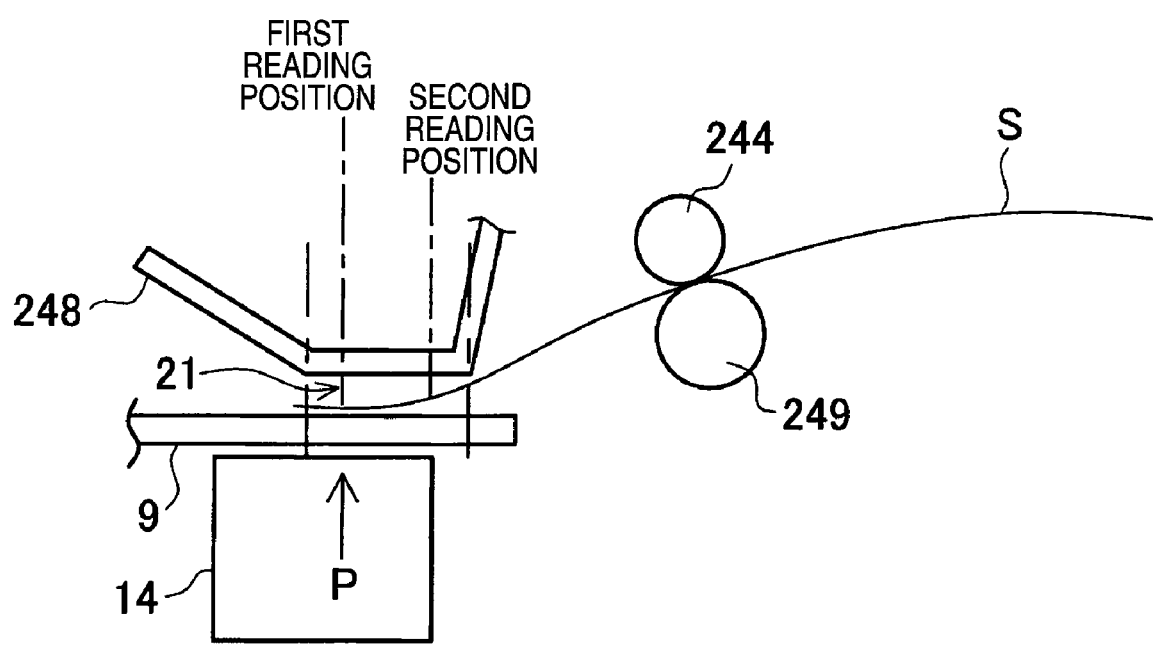
FIG. 10 is a diagram showing a schematic configuration of the periphery of a reading region according to the second mode, in which the image sensor reads in a first reading position.

Also, in the second mode of the exemplary embodiment, reading positions by the image sensor 14 are positioned at two places of the inside of the reading region 21 as shown in FIG. 10. Specifically, two reading positions set in the ADF 7 includes a first reading position at which the image sensor 14 reads the white region 248A and a second reading position at which the image sensor 14 reads the pattern region 248B (see FIG. 7).

A region of the downstream side of the white region 248A is not necessarily the pattern and may have solid color other than white color, for example, black color. However, since a particular pattern with a different concentration in the main scanning direction is rarely detected in the trailing end of the document S, it is advantageous to detect whether the document S remains while comparing with the predetermined pattern as shown in FIG. 7 in improving accuracy.

Figure 11:
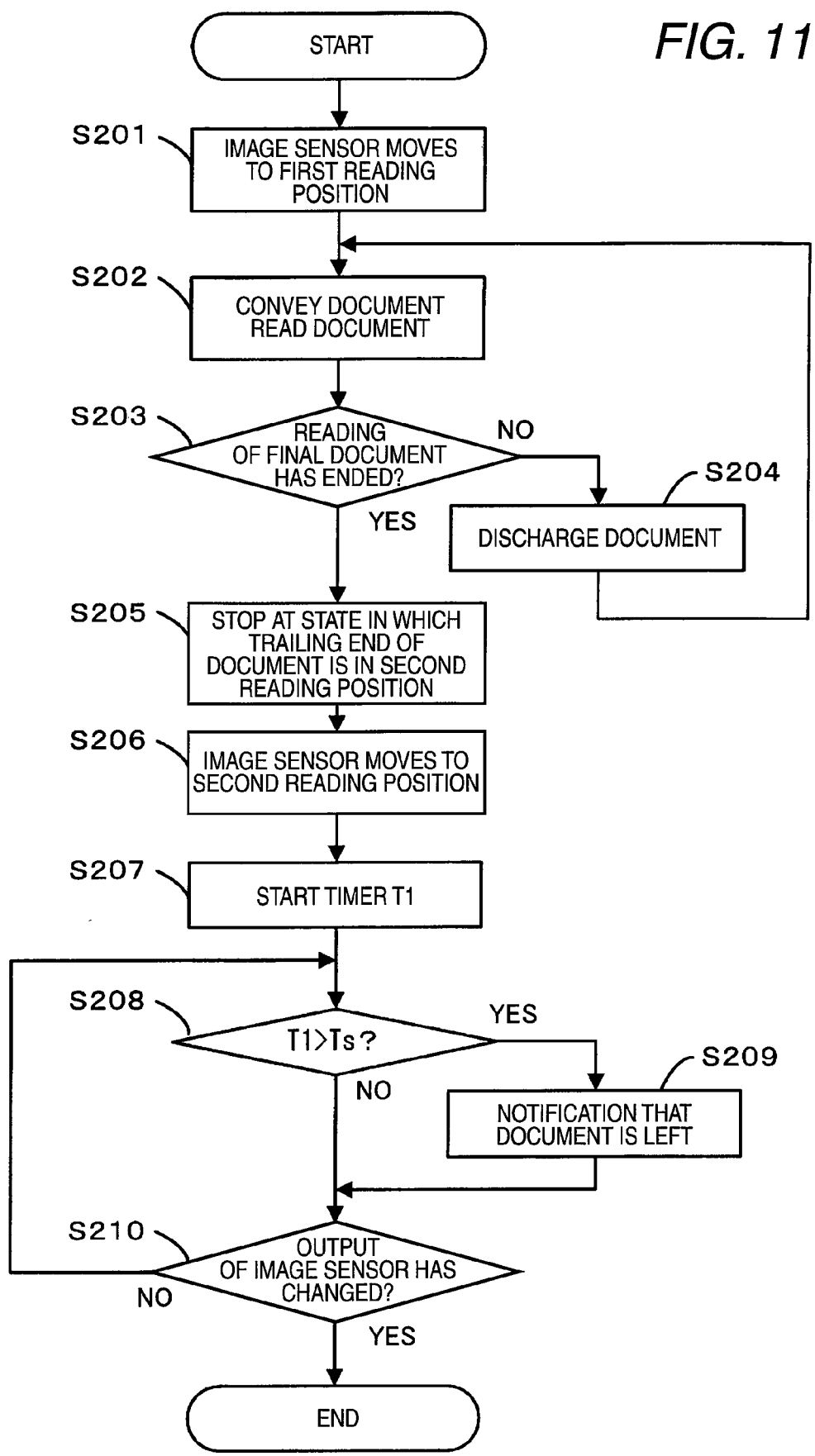
FIG. 11 is a flowchart showing a procedure (second mode) of a document conveyance operation at the time of reading a document by the ADF.

A document conveyance control of the second mode by the ADF 7 will be described with reference to a flowchart of FIG. 11. In the following explanation, it is assumed that plural documents would be previously placed on the document tray 22. When a scan start button of the operation panel 4 is pressed, automatic document conveyance of the ADF 7 is started.

First, the image sensor 14 moves in the first reading position opposed to the white region 248A of the document holder 248 just under the ADF glass 9 while the ADF glass 9 being sandwiched therebetween as shown in FIG. 10 (S201). That is, the image sensor 14 moves to the position at which the reading point P matches the first reading position of the inside of the reading region 21. Thereafter, a document is conveyed inside the conveyance path 24 one by one and an image of the document is read by the image sensor 14 while the document passing through the first reading position (S202).

Next, it is determined whether reading of the final document has ended (S203). The determination as to whether a conveyed document is the final document can be made based on a signal from the front sensor 25. If the document is not the final document (S203: NO), the document is discharged to the discharging tray 23 (S204) and the next document is conveyed.

If reading of the final document has ended (S203: YES), conveyance in a forward direction is stopped while the discharge roller 244 pinching the final document (S205). Specifically, conveyance of the document in the forward direction is stopped at the position before the trailing end of the final document passes through the second reading position after the trailing end passes through the first reading position. Consequently, the final document remains in the conveyance path 24 and the documents other than the final document are placed on the discharging tray 23. In the second mode, the conveyance operation is stopped so that the trailing end of the final document is positioned within the pattern region 248B at the downstream side than the first reading position. Therefore, the final document is read to the trailing end, and the reading of the document is surely performed.

Figure 12:
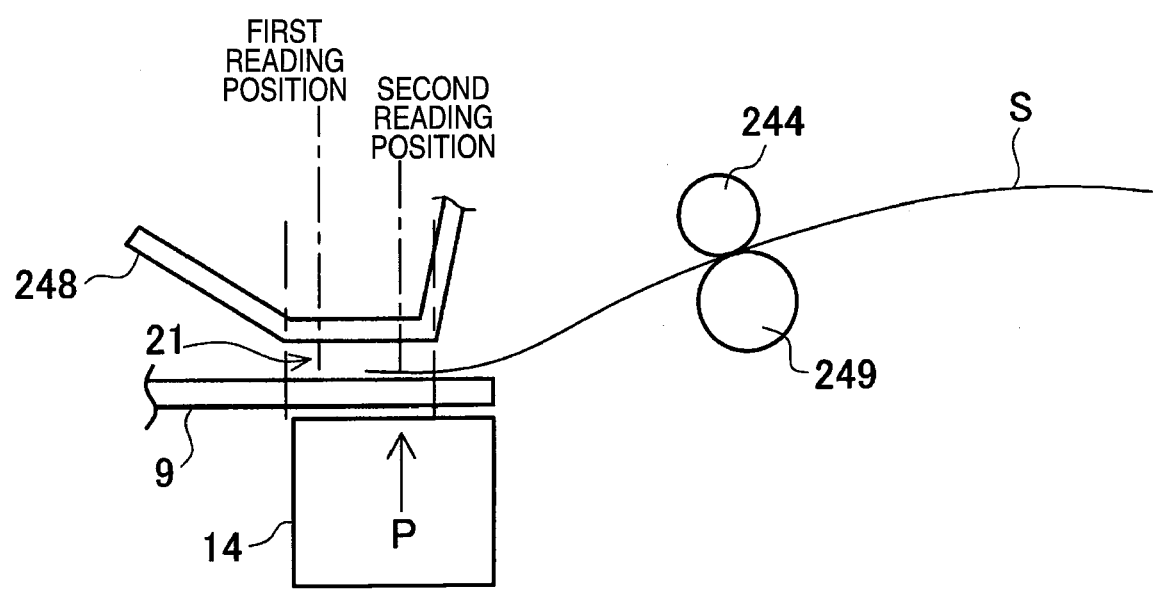
FIG. 12 is a diagram showing a schematic configuration of the periphery of a reading region according to the second mode, in which the image sensor reads in a second reading position.

Thereafter, the image sensor 14 moves to the second reading position opposed to the pattern region 248B of the document holder 248 while the ADF glass 9 being sandwiched therebetween as shown in FIG. 12 (S206). That is, the image sensor 14 moves to the position at which the reading point P matches the second reading position of the inside of the reading region 21. At this time, the trailing end of the final document is positioned at the second reading position. This enables reading of the trailing end of the final document by the image sensor 14. That is, it can be determined whether the final document remains based on a reading signal from the image sensor 14.

Then, a timer T1 is initialized and is started (S207). Thereafter, it is determined whether the timer T1 has measured a specific time Ts (S208). If the timer has measured the specific time Ts (S208: YES), a user is notified that a document is left (S209). After notification that the document is left, the control proceeds to operation S210.

If the timer has not measured the specific time Ts (S208: NO), it is determined whether the output of the image sensor 14 has changed by a threshold value or more (S210). That is, a difference exists in the output of the image sensor 14 between a state in which the trailing end of the document remains and the document is read and a state in which the document is removed and the pattern region 248B of the document holder 248, having the stripe-shaped pattern is read. As a result, when the document is removed, the output of the image sensor 14 changes largely. In other words, it can be determined whether the document is removed by monitoring the output of the image sensor 14.

If the output of the image sensor 14 has not changed (S210: NO), it is determined that the final document still remains, and the control returns to operation S208. On the other hand, if the output of the image sensor 14 has changed (S210: YES), it is determined that the final document is removed, and the control ends.

As described above in detail, the multi function device 100 of the exemplary embodiment has a function of automatically conveying a document by the ADF 7 and reading the conveyed document by the image sensor 14. Then, the trailing end of the document after reading can be read by conveying the document in the backward direction (first mode) or moving the image sensor 14 to the downstream side (second mode) in the ADF 7.

That is, in the multi function device 100, a document after reading is not discharged and the trailing end of the document is stopped within the reading region 21. Thereafter, if the document is removed, the trailing end of the document is not detected by the image sensor 14. On the other hand, if the document is left, the trailing end of the document continues to be detected by the image sensor 14. Accordingly, it can be determined that the document is left.

That is, in the multi function device 100, the image sensor 14 also functions as a sensor for detection of leaving of the document. Therefore, the leaving of the document can be detected without a dedicated sensor. When the document is left, a user is notified that the document is left. Accordingly, attention to the leaving of the document is drawn and the document can be prevented from being left. Hence, an image reading device capable of reducing or preventing the document from being left by a smaller number of components can be implemented.

The multi function device 100 includes the front sensor 25 for detecting the final document and when the front sensor 25 detects the final document, the trailing end of its final document is stopped within the reading region 21 and when the document is not the final document, the document is discharged. That is, when the document is not the final document, the document is discharged speedily and only the final document is stopped within the reading region 21. Since a conveyance operation is not stopped except for the final document, an influence on a reading speed rate is small.

While the present invention has been shown and described with reference to certain exemplary embodiments thereof, it will be understood by those skilled in the art that various changes in form and details may be made therein without departing from the spirit and scope of the invention as defined by the appended claims.

The inventive concept of the present invention is applied not limited to the multi function device and can be applied to any devices including a scanner function, for example, a copying machine, a scanner and a FAX.

In the multi function device of the exemplary embodiment, user's attention is drawn by notification such as message display when a document is left, but in addition to such notification way, a scan function may be disabled until a document is removed.

In the multi function device of the exemplary embodiment, the one-way clutch is employed for decreasing resistance at the time of pulling a document. However, this is not limited thereto. The resistance may be decreased by coupling control of gears. That is, after the trailing end of the final document is stopped within the reading region, the discharge roller 244 is uncoupled from a driving motor by control. Accordingly, rotational force at the time of pulling the document is not transmitted to the driving motor and it becomes easy to pull the final document.

In the first mode of the exemplary embodiment, the trailing end of a document can be read by conveying the document in the backward direction after the trailing end of the document is entirely read, but it is not always necessary to conveys the document in the backward direction. That is, the trailing end of the document may be stopped within a reading region without passing through the reading region. Accordingly, it can be determined that the document is left although the reading of the trailing end of the document is influenced.

What is claimed is:

1. An image reading device comprising:
   a conveying section having a first tray for placing a document before reading and a second tray for placing the document after reading, and wherein the conveying section is configured to convey the document from the first tray to the second tray via a reading region;
   a reading section including an image sensor configured to read an image from the document passing through the reading region;
   a stopping section configured to stop a trailing end of the document conveyed by the conveying section within the reading region;
   a determining section configured to determine whether the document remains within the reading region based on a signal from the image sensor; and
   a detecting section configured to detect whether the document conveyed by the conveying section is a final document among documents on the first tray,
   wherein if the detecting section detects that the document is the final document, the trailing end of the final document is stopped within the reading region by the stopping section, and if not, the document is discharged to the second tray.

2. The image reading device according to claim 1,
   wherein the stopping section is configured to stop the trailing end of the document within the reading region after conveying the document having passed through the reading region, in a backward direction.

3. The image reading device according to claim 1, further comprising:
   a first reading range positioned within the reading region; and
   a second reading range positioned within the reading region at a downstream side of the first reading range in a conveying direction of the document,
   wherein the stopping section is configured to stop the trailing end of the document at a position opposed to the second reading range, and
   wherein the reading section is arranged at a position opposed to the first reading range while reading the document and is arranged at a position opposed to the second reading range when determining whether the document remains within the reading region.

4. The image reading device according to claim 3,
   wherein the first reading range is configured with a white region, and
   wherein at least a part of the second reading range is configured with a colored region having a color other than white.

5. The image reading device according to claim 4,
   wherein the second reading range is configured with a pattern having a different concentration in a direction orthogonal to the conveying direction of the document.

6. The image reading device according to claim 5,
   wherein the pattern includes stripes in which stripes of one or more colors other than white and white stripes are repeated in the direction orthogonal to the conveying direction of the document.

7. The image reading device according to claim 1,
   wherein, in the conveying section, a resistance when moving the document in a conveying direction of the document is smaller than a resistance when moving a document in a backward direction opposite to the conveying direction.

8. The image reading device according to claim 1,
   wherein the conveying section includes a pair of rollers configured to discharge the document to the second tray, and
   wherein the stopping section is configured to stop the document while the rollers nip the document.

9. The image reading device according to claim 1, further comprising a notifying section configured to provide a notification that the document remains within the reading region.

10. The image reading device according to claim 9, further comprising a timer configured to measure a time period during which the document remains within the reading region, wherein if the determining section determines that the document remains within the reading region for a specific time period with reference to the timer, the notifying section is configured to provide the notification that the document remains.

11. The image reading device according to claim 9, wherein the notifying section includes a display configured to displays a message indicating that the document remains.

* * * * *